Figure 7:
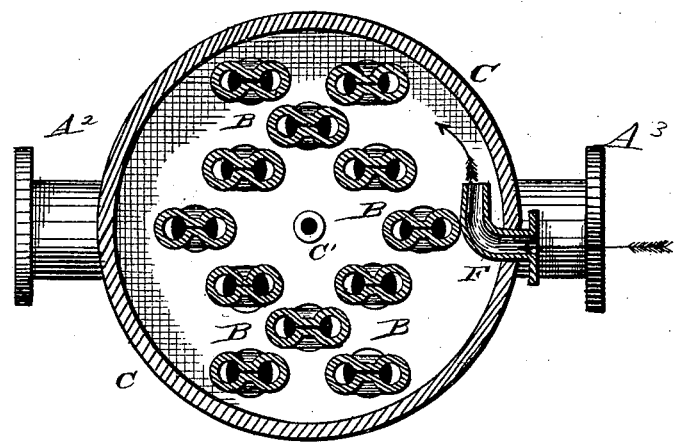

(No Model.) 2 Sheets—Sheet 1.
W. P. THOMPSON.
FEED WATER HEATER AND PURIFIER.
No. 282,804. Patented Aug. 7, 1883.
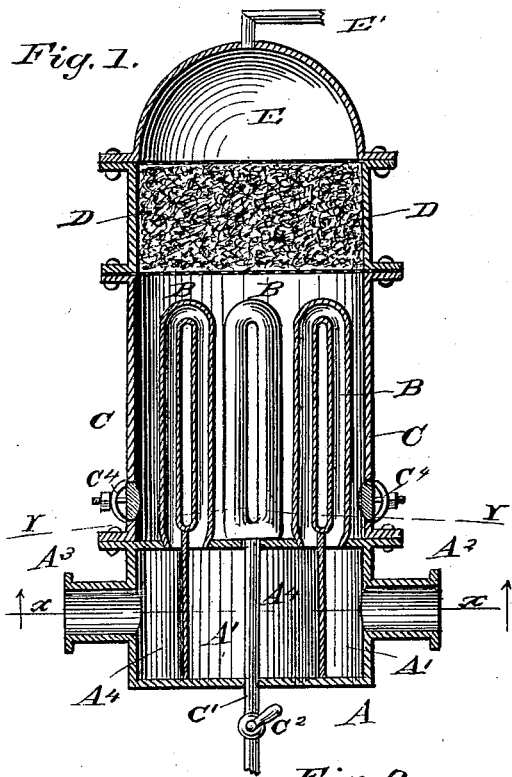
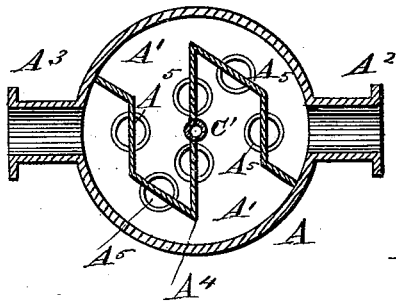
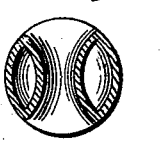
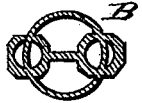
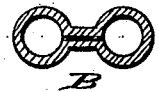
WITNESSES:
J Daniel Eby
Linn Wheeler
INVENTOR
Wm. P. Thompson (No Model.) 2 Sheets—Sheet 2.

W. P. THOMPSON.
FEED WATER HEATER AND PURIFIER.

No. 282,804. Patented Aug. 7, 1883.

WITNESSES:
J. Daniel Eby
Linn Wheeler

INVENTOR
Wm. P. Thompson

UNITED STATES PATENT OFFICE.

WILLIAM P. THOMPSON, OF PHILADELPHIA, PENNSYLVANIA.

FEED-WATER HEATER AND PURIFIER.

SPECIFICATION forming part of Letters Patent No. 282,804, dated August 7, 1883.

Application filed March 12, 1883. (No model.)

*To all whom it may concern:*

Be it known that I, WILLIAM P. THOMPSON, a citizen of the United States, residing at Philadelphia, in the county of Philadelphia and State of Pennsylvania, have invented certain new and useful Improvements in Feed-Water Heaters and Purifiers; and I do hereby declare the following to be a sufficiently full, clear, and exact description thereof as to enable others skilled in the art to make and use the said invention.

This invention relates to that class of heaters wherein exhaust-steam passing through tubes contained in a vessel through which the feed-water passing to the steam-boiler receives heat by conduction from the tubes and precipitates and separates some or all of the impurities contained in the water, and thus assists in keeping the boiler clean.

The nature of this invention consists in a chamber having partitions which direct the current of exhaust-steam entering upon one side and compel it to flow through twin or partitioned pipes attached by a single joint to the exhaust-chamber before reaching the outlet, and a vessel inclosing the twin pipes, into which the feed-water is forced in a tangential direction, producing a rotative current at the lower part, and the vessel is surmounted with a filter through which the heated water passes to an upper chamber, whence it flows, by a suitable pipe, to the boiler. The precipitated impurities of the water, by reason of the rotative motion of the water, are driven to the center and are discharged through a blow-off tube in the bottom of the chamber containing the heated twin pipes.

I will now proceed to particularly describe the construction and operation of this invention, referring in so doing to the drawings annexed, in which—

Figure 1 shows a vertical central section; Fig. 2, a section in the plane indicated by the dotted line X X in Fig. 1. Figs. 3, 4, and 5 show in horizontal sections forms of twin tubes applicable to this apparatus; Fig. 6, another in elevation; and Fig. 7 is a horizontal section in a plane intersecting the feed-water admission or inlet tube, as indicated by the dotted line Y Y in Fig. 1.

The same letters of reference apply to the same parts in the several figures.

A represents the base, consisting of a chamber, A', preferably of cylindric form, and having inlet or outlet nozzles or necks, (marked, respectively, $A^2$ and $A^3$,) by which exhaust-steam is received and discharged. A partition, $A^4$, of labyrinthian form, divides the chamber A' into two parts not in fluid connection with each other, excepting by means of a number of apertures, $A^5$, in its upper side, which extend across the partition $A^4$. Into each of the apertures $A^5$ are inserted, preferably by screwing, looped pipes B, similar in construction to the form of steam-heating radiators known in the arts as "Bundy's Radiators," and fully described in Letters Patent of the United States, numbered 130,013, and dated July 30, 1872. The precise form shown in said Letters Patent is not essential, so long as the tubes have a partition or sufficient contraction between the two channels to direct the steam to the end of the loop on one side and allow it to return upon the other. These looped pipes B are inserted so that the partition or contraction between the channels coincides with the partition $A^4$, so that steam admitted by the neck $A^2$ passes through the pipes B up one channel and down the other, thus crossing the partition $A^4$ and finding an exit at the neck $A^3$.

Above the base A, and secured to it by a fluid-tight joint, is a vessel, C, surrounding the pipes B and surmounted by a filter, D, having a cap or chamber, E, forming a receptacle for filtered hot water, which is delivered thence by a pipe, E'.

All parts of the vessel C, filter D, and chamber E, and also the top of the vessel A and pipe B, and also all the joints connecting the same should be of such strength as to safely retain fluids at the boiler-pressure. A water-inlet, F, is provided, by which water from a pump or injector or other means of supply formed near the base of the vessel C, which inlet or supply tube is of such form as to direct the water as it enters tangentially, and thus produce a rotating current in the vessel C. From the center of the bottom of the vessel C a blow-off pipe, C', extends through the base A, and is provided with a suitable cock or valve, C², whereby impure water containing the precipitated foreign substances of the feed-water may from time to time be discharged. Holes C⁴, closed by stoppers or plates, are also provided for purposes of cleansing.

Instead of the partitions A⁴ extending up to the plate forming the top of the vessel A, wings may be formed on the ends of the looped pipes B to perform the same function, as shown in Fig. 6, and this arrangement affords a space for the working of the taps or other boring and screw-threading tools used in fitting the base to be worked in. Having but a single joint of attachment to the vessel A, the tubes B are not liable to leak from local or unequal expansion.

The operation of this invention is as follows: Steam admitted by the nozzle A² to the chamber A' is directed by the partition A⁴ through the looped pipes B, whence it passes to the opposite side of the partition A⁴ and escapes by the nozzle A³. Water is forced in at the inlet F in a tangential direction, and produces a rotating current and fills the chamber C, and is heated by the pipes B, depositing its precipitated impurities in the bottom of the vessel C, and is forced through the filter D, and is there further purified and discharged through the vessel E and pipe E' of the boiler. By opening the blow-off cock C² the muddy water containing the precipitated impurities held by the rotary motion near the cock is expelled, and at the same time a descending current flowing from the vessel E through the filter D disengages and throws down impurities which would otherwise clog and obstruct the filter.

I am aware that feed-water heaters and purifiers have been made wherein pipes having two points of attachment conducted exhaust-steam from one chamber to another through feed-water, under pressure, in a vessel connected to and feeding a steam-boiler. Such heaters are not claimed as a part of this invention; but

What I claim is—

In a feed-water heater and purifier, the combination of a vessel adapted to retain water under a boiler-pressure, and containing double or twin tubes secured therein by a single screw-joint attachment, through which tubes exhaust-steam is circulated, with a superposed filter arranged to discharge heated feed-water upwardly to a pipe leading to the boiler, and having at its base a central blow-off cock provided with a suitable valve, and a feed-inlet pipe arranged to admit water tangentially to the said vessel, substantially as and for the purposes set forth.

WM. P. THOMPSON.

Witnesses:
J. DANIEL EBY,
LINN WHEELER.